US008125956B2

(12) United States Patent
Reddy et al.

(10) Patent No.: US 8,125,956 B2
(45) Date of Patent: Feb. 28, 2012

(54) METHOD OF CELL RESELECTION IN A WIRELESS TELECOMMUNICATIONS DEVICE OPERATIVE WITH A PLURALITY OF RADIO ACCESS NETWORKS

(75) Inventors: Giri Narayana Reddy, Birmingham (GB); Andrew Farnsworth, Marlbrook (GB)

(73) Assignee: Research In Motion Limited, Waterloo (CA)

(*) Notice: Subject to any disclaimer, the term of this patent is extended or adjusted under 35 U.S.C. 154(b) by 800 days.

(21) Appl. No.: 12/175,093

(22) Filed: Jul. 17, 2008

(65) Prior Publication Data

US 2010/0014454 A1 Jan. 21, 2010

(51) Int. Cl.
*H04W 4/00* (2009.01)
(52) U.S. Cl. .................. 370/331; 370/338; 455/436
(58) Field of Classification Search .................. None
See application file for complete search history.

(56) References Cited

U.S. PATENT DOCUMENTS

| | | | |
|---|---|---|---|
| 7,430,417 B2* | 9/2008 | Sanchez et al. | 455/436 |
| 7,483,702 B2* | 1/2009 | Yeo et al. | 455/449 |
| 7,493,120 B2* | 2/2009 | Kim et al. | 455/436 |
| 7,535,846 B2* | 5/2009 | Kim et al. | 370/241 |
| 7,643,786 B2* | 1/2010 | Soderbacka et al. | 455/3.01 |
| 2004/0136340 A1* | 7/2004 | Sanchez et al. | 370/329 |
| 2004/0266435 A1* | 12/2004 | de Jong et al. | 455/436 |
| 2005/0048970 A1* | 3/2005 | Hannu et al. | 455/432.2 |
| 2005/0048974 A1* | 3/2005 | Kim et al. | 455/436 |
| 2006/0040700 A1* | 2/2006 | Roberts et al. | 455/525 |
| 2008/0102847 A1* | 5/2008 | Kim et al. | 455/450 |
| 2009/0233600 A1* | 9/2009 | Johansson et al. | 455/435.2 |

FOREIGN PATENT DOCUMENTS

| | | |
|---|---|---|
| EP | 1 835 780 A2 | 9/2007 |
| EP | 1 916 865 A2 | 4/2008 |
| WO | 2005/089009 A1 | 9/2005 |
| WO | 2007/086679 A1 | 8/2007 |

OTHER PUBLICATIONS

3GPP TS45.008 v 5.22.0 (in particular section 6.6.5).
TSG-RAN Meeting #27, Tokyo, Japan, Mar. 9-11, 2005, RP-050073, Agenda Item 8.3.5, Source: TSG-RAN WG2, Title: CRs to 25.304 on Cell Reselection (HCS and non-HCS).

* cited by examiner

*Primary Examiner* — Bob Phunkulh
(74) *Attorney, Agent, or Firm* — Fitch Even Tabin & Flannery LLC

(57) ABSTRACT

Apparatus and a method of cell reselection in a wireless telecommunications device operative with a plurality of radio access networks are disclosed. The method comprises, when the device is camped on a first radio access network: ranking cells in a neighboring list according to cell reselection criteria; considering for cell reselection a cell in the neighboring list; when the cell in the list is a cell of a second radio access network different from the first radio access network, applying an algorithm for cell reselection from the second radio access network to the first radio access network; and when the algorithm as applied would result in reselection to the first radio access network, considering for cell reselection another cell in the list.

22 Claims, 5 Drawing Sheets

METHOD OF CELL RESELECTION IN A WIRELESS TELECOMMUNICATIONS DEVICE OPERATIVE WITH A PLURALITY OF RADIO ACCESS NETWORKS

BACKGROUND

1. Technical Field

This application relates to mobile telecommunications systems in general, having particular application in UMTS (Universal Mobile Telecommunications System) in general, and in particular relates to an apparatus and method of cell reselection in a wireless telecommunications device operative with a plurality of radio access networks.

2. Description of the Related Art

In a typical cellular radio system, a wireless telecommunication device communicates via one or more radio access radio networks (RAN) to one or more core networks. In UMTS system such devices are typically referred to as User Equipment (UE) and in GSM such devices are typically referred to as Mobile Stations (MS). Such devices comprise various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

In the following, reference will be made to UMTS and GSM and to particular standards. However it should be understood that the invention is not intended to be limited to any particular mobile telecommunications system.

A radio access network covers a geographical area divided into a plurality of cell areas. Each cell area is served by at least one base station, which provides the radio link between the mobile device and the radio access network. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

GSM is a second generation public land mobile telecommunication system. UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device that is operable with a plurality of radio access networks. From time to time a mobile device currently operating with a first radio access network may need to change to operate with another radio access network. As described in PCT patent application WO2007/086679 for instance this may result in so-called "ping-ponging" from one radio access network to another. There is a need to reduce this so-called "ping-ponging" of the device.

There are thus proposed strategies for cell reselection in a wireless telecommunications device operative with a plurality of radio access networks. A number of such strategies are detailed below.

Other aspects and features of the proposed strategy will become apparent to those ordinarily skilled in the art upon review of the following description of specific embodiments of an apparatus and method of cell reselection in a wireless telecommunications device operative with a plurality of radio access networks.

BRIEF DESCRIPTION OF THE DRAWINGS

Embodiments will now be described, by way of example only, with reference to the attached drawings, in which.

The same reference numerals used in different figures denote similar elements.

DETAILED DESCRIPTION OF THE DRAWINGS

An apparatus and method of cell reselection in a wireless telecommunications device operative with a plurality of radio access networks is described. In the following description, for the purposes of explanation, numerous specific details are set forth in order to provide a thorough understanding of the present invention. It will be apparent, however, to one skilled in the art that the technique may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method of cell reselection in a wireless telecommunications device operative with a plurality of radio access networks. In other aspects, the invention encompasses apparatus and a computer-readable medium configured to carry out the foregoing actions. In particular, the method may be implemented in a mobile telecommunications device, with or without voice capabilities, or other electronic devices such as handheld or portable devices.

Figure 1:
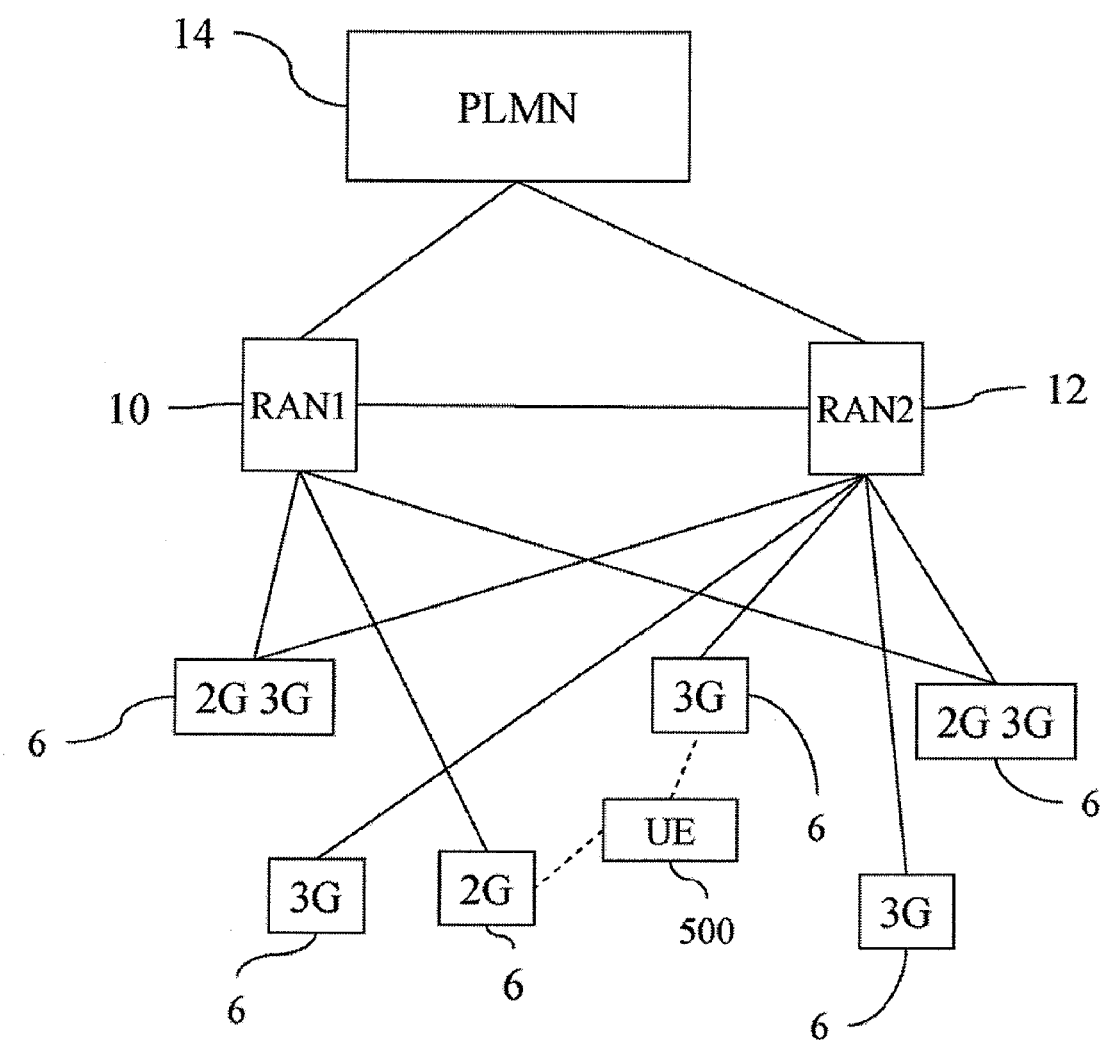
FIG. 1 shows an overview of a network and a user equipment device.

FIG. 1 shows an overview of a telecommunications network and a wireless telecommunications device 500. Clearly in practice there may be many such devices operating with the network but, for the sake of simplicity, FIG. 1 only shows a single wireless telecommunications device 500. For the purposes of illustration, FIG. 1 also shows a network having a few components. It will be clear to a person skilled in the art that in practice a network will include far more components than those shown. Furthermore, FIG. 1 shows only two radio access networks. Again it will be clear to a person skilled in the art that typical mobile telecommunications set-up may involve more radio access networks and/or different radio access network.

FIG. 1 shows an overview of wireless telecommunications. Across a geographical area, there may be one or more radio access networks (RANs), each operating according to a given standard. For the purposes of illustration, we will consider two radio access networks. The first radio access network and the second radio access network operate, again for purposes of illustration, according to the radio access technologies GSM and UMTS respectively. GSM and UMTS are typical second and third generation wireless telecommunications access technologies respectively. Typically each radio access network includes radio access devices 6 to provide the physical radio link between the wireless telecommunications device 500 and the rest of the radio access network. These radio access devices 6 are known as base stations in GSM and Node Bs in UMTS. Further components of the GSM radio access network are indicated by reference numeral 10 and comprise for example Mobile Switching Centres (MSCs), Base Station Controllers (BSCs), GSM Switching Centres, the GSM Core Network etc. Further components of the UMTS radio access network are indicated by reference numeral 12 and comprise for example Radio Network Subsystems (RNSs), Radio Network Controllers (RNCs), 3G mobile switching centres (3G MSC), 3G serving GPRS support nodes (3G SGSNs), the UMTS Core Network etc. Typically each radio access network is ultimately connected to a Public Switched Telephone Network (PSTN) 14.

Wireless telecommunications device 500 may be mobile within the radio access network. Radio connections (indicated by the straight dotted lines in FIG. 1) are established between the wireless telecommunications device and one or more of the radio access devices 6.

The radio access devices 6 (e.g. the GSM Base stations and the UMTS Node Bs) control one or more cells. Typically the radio access devices 6 are mounted high e.g. up a mast and may be co-located e.g. GSM base stations and UMTS Node Bs on the same mast. FIG. 1 shows some radio access devices 6 as being single mode (e.g. 2G or 3G only) and some as being dual mode (e.g. 2G and 3G). In UMTS each cell is uniquely identified by a frequency and a primary scrambling code. Generally in UMTS a cell refers to a radio network object that can be uniquely identified by a wireless telecommunications device from a cell identifier that is broadcast over geographical areas from a UTRAN (UMTS Radio Access Network) access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B may operate as more than one cell since it may operate at multiple frequencies and/or with multiple scrambling codes.

When a wireless telecommunications device 500 is switched on, it will attempt to select a cell on which to camp. It then transmits signals to and receives signals from the cell on which it camps. The wireless telecommunications device also receives a broadcast list of neighbouring cells and builds up a so-called neighbour cell list of cells in its vicinity which neighbour cell list allows a wireless telecommunications device to determine with which other cell(s) it may be capable of communicating. From time to time, the wireless telecommunications device undertakes a cell reselection process. Cell reselection may occur for a variety of reasons e.g. because of a decrease in the quality of the signal to or from the cell on which it is camped or because the cell on which it is camped is unable to provide a service which the wireless telecommunications device requires. Prior to undertaking cell reselection, the wireless telecommunications device periodically measures neighbouring cells. These measurements generally give an indication of the quality of signal from a given cell. The measurements tend to be defined in various standards and may relate to the signal-to-noise ratio, signal strength, error rate etc. A multi-mode mobile communication device carries out measurements of cells in a plurality of radio access networks.

When the cell carries out cell reselection, the cell ranks the cells in its neighbouring cell list in order and then attempts cell reselection with the highest ranking cell. If the highest ranking cell is determined to be unsuitable for any reason, the wireless telecommunications device then attempts cell reselection with the next cell in the list and so on until either a suitable cell is found or all the cells in the list are determined to be unsuitable.

Figure 2:
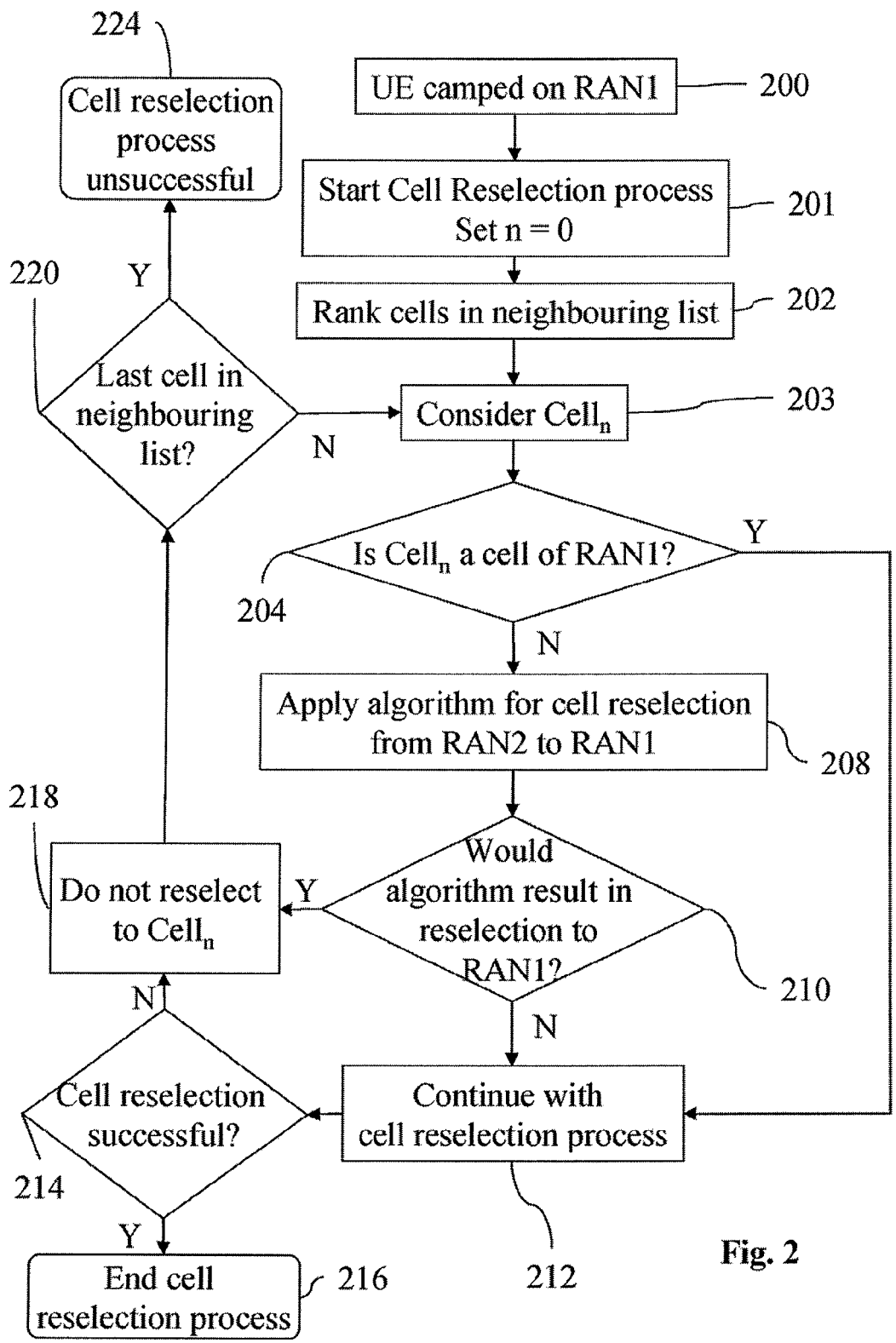
FIG. 2 is a flow diagram illustrating a first embodiment of a method of cell reselection in a wireless telecommunications device operative with a plurality of radio access networks.

FIG. 2 illustrates a first embodiment of a method of cell reselection. The wireless telecommunications device is camped on a cell of a first radio access network RAN1 (200). The wireless telecommunications device then starts the cell reselection process (201). The device then ranks the cells (202) in the neighbouring list according to certain criteria for cell reselection. The device then considers (203) the highest ranked cell in the list and determines (204) whether it is a cell of the same radio access network RAN1.

If the cell being considered is a cell of a second radio access network different from the radio access network on which the device is currently camped (204 answered in the negative), the device carries out a further test (208, 210). This test involves applying to measurements of the first radio access network and the second radio access network an algorithm for cell reselection from the second radio access network to the first radio access network (208). That is, action 208 comprises applying to the measurements of the first radio access network and the second radio access network the algorithm for cell reselection that would be applied in the second radio access network to determine whether the algorithm when applied would result in reselection to the first radio access network. From this algorithm, the device then determines (210) whether cell reselection from the second radio access network to the first radio access network would be required if the device were to camp on the cell of the second radio access network.

To enable this, the device, when operating with the first radio access network, imports system information from the second radio access network to determine whether cell reselection from the second radio access network to the first radio access network would occur.

The algorithm for cell reselection from the second radio access network to the first radio access network may be applied in many different ways. Furthermore, an offset may be applied to one or more of the current measurements before the algorithm is applied. With this implementation, the wireless telecommunications device is less likely to reselect the cell of the second radio access network if the decision to reselect from the second radio access network to the first radio access network based on the current measurements without an offset would be borderline.

When the wireless telecommunications device, operating with the first radio access network, determines that the algorithm for cell reselection from the second radio access network to the first radio access network would not result in reselection to the first radio access network (210 answered in the negative), the device may continue with cell reselection to the cell of the second radio access network (212) according to known procedures which will not be considered further in this document. It will be appreciated by the skilled reader that other steps for cell reselection are undertaken (212). If successful cell reselection to the cell under consideration is not achieved (214) then the next cell in the neighbouring cell will be considered (203). If successful cell reselection to the cell under consideration is achieved (214) then the cell reselection process ends (216).

When the device, operating with the first radio access network, determines that the algorithm for cell reselection from the second radio access network to the first radio access network would result in reselection to the first radio access network (210 answered in the affirmative), the cell under consideration is not selected (218) and the device then considers the next highest cell in the neighbouring cell list (203). The likelihood of the device ping-ponging between the first radio access network and the second radio access network should therefore be reduced.

When the cell being considered is a cell of the first radio access network (204 answered in the affirmative), the device attempts cell reselection (212) according to known procedures which will not be considered further in this document, as discussed above. If successful cell reselection to the cell under consideration is achieved (214) then the cell reselection process ends (216). If successful cell reselection to the cell under consideration is not achieved (214) then reselection to the cell does not occur and the next cell in the neighbouring cell will be considered (203). If the cell under consideration is the last cell in the list (220) then the cell reselection process ends, unsuccessfully (222). This may result in the mobile telecommunications device being out-of-service.

Figure 3:
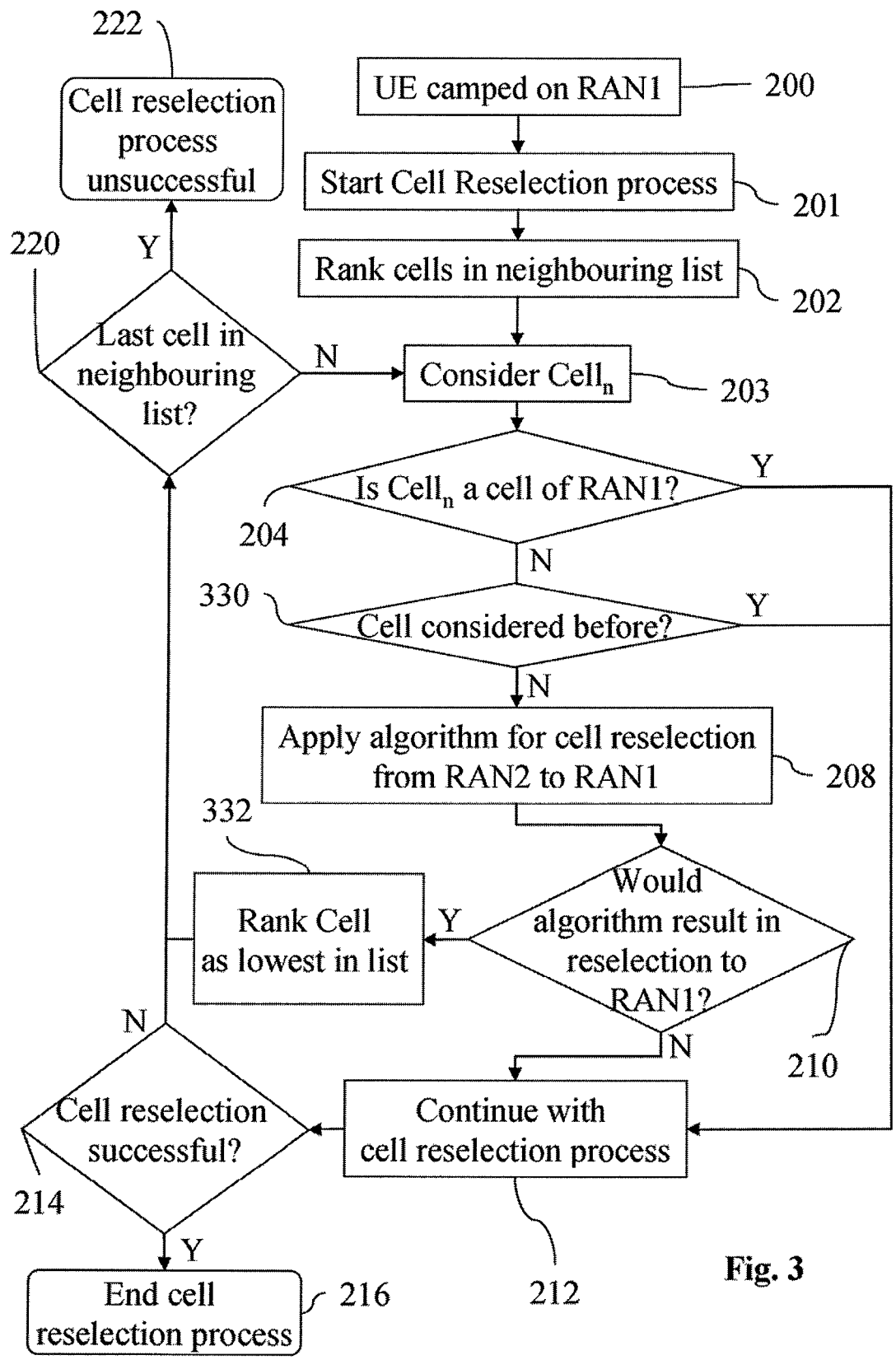
FIG. 3 is a flow diagram illustrating a second embodiment of a method of cell reselection in a wireless telecommunications device operative with a plurality of radio access networks.

FIG. 3 is a flow chart illustrating a further example of a method of cell reselection. The same reference numerals indicate the same steps as described with reference to FIG. 2. The implementation illustrated in FIG. 3 attempts to reduce the likelihood of a device being out-of-service. As shown in FIG. 3, the wireless telecommunications device is camped on a cell of a first radio access network RAN1 (200). The wireless telecommunications device then starts the cell reselection process (201). The device then ranks the cells (202) in the neighbouring list according to certain criteria for cell reselection. The device then considers (203) the highest ranked cell in the list and determines (204) whether it is a cell of the same radio access network RAN1.

When the cell under consideration is a cell of the second network (action 204 answered in the negative), a further consideration is applied (330). This consideration (330) is whether the cell under consideration has already been considered during the current cell reselection process. If this is answered in the negative, the device applies an algorithm for cell reselection from the second radio access network to the first radio access network (208). The wireless telecommunications device, operating with the first radio access network, then determines (210) whether the algorithm for cell reselection from the second radio access network to the first radio access network would result in reselection to the first radio access network. When the device determines (210) that the algorithm for cell reselection from the second radio access network to the first radio access network would not result in reselection to the first radio access network (210 answered in the negative), the device may continue (212) with cell reselection to the cell of the second radio access network.

When the device determines (210) that the algorithm for cell reselection from the second radio access network to the first radio access network would result in reselection to the first radio access network (210 answered in the affirmative), the device ranks the cell (332) lower in the neighbouring cell list (e.g. the cell is made the lowest ranking cell in the list). The cell is not reselected but will be reconsidered by the mobile telecommunications device during cell reselection if all the cells above the re-ranked cell are deemed to be unsuitable. In this case, when the device determines whether the cell under consideration has already been considered during the current cell reselection process (330), this is answered in the affirmative. The device does not apply actions 208 and 210 but continues (212) with cell reselection to the cell of the second radio access network according to known procedures which will not be considered further in this document. It will be appreciated by the skilled reader that other steps for cell reselection are undertaken (212). If successful cell reselection to the cell under consideration is achieved (214) then the cell reselection process ends (216). If successful cell reselection to the cell under consideration is not achieved (214) then any further cells in the list are considered (for instance other cells of the second radio access network for which action 210 was answered in the affirmative). If cell reselection is not successful with any cells in the neighbour list, then cell reselection is unsuccessful (222) and the device is deemed out of service.

The embodiment of FIG. 3 means that if the only cell deemed to be suitable is a cell of the second radio access network, reselection to the cell will be attempted even if the algorithm for cell reselection from the second radio access network to the first radio access network would result in reselection to the first radio access network. The mobile communications would therefore camp on the second radio access network (however briefly) rather than being deemed out-of-service.

Specific examples will now be considered, with reference to FIG. 2. As a first example, consider when a dual mode UMTS/GSM wireless telecommunications device is camped on a UMTS cell. While camped on a UMTS call, according to 3GPP technical specification 25.331 v5.19.0 (herein incorporated in its entirety) and sections 7.2.1, 7.2.2.1, and 7.2.2.2 thereof, a UE performs cell reselection when in Idle, Cell_FACH, Cell_PCH, and URA_PCH. According to 25.304 v5.9.0, sections 5.2.6 and 5.4.3, the UE may be required to measure GSM cells for the cell reselection process. As shown in FIG. 2, the device starts the cell reselection process (201). The device ranks the cells (202) in the neighbouring list according to certain criteria for cell reselection. The device then considers (203) the highest ranked cell in the list and determines (204) whether it is a UMTS cell.

If the cell being considered is a GSM cell (204 answered in the negative), the device carries out a further test (208). This test involves applying to current measurements of the GSM network an algorithm for cell reselection from GSM to the UMTS (208). That is, action 208 comprises applying to the current measurements of the GSM network the algorithm for cell reselection that would be applied in the GSM network to determine whether the algorithm when applied would result in reselection to UMTS. From this algorithm, the device then determines (210) whether cell reselection from the GSM to UMTS would be required if the device were to camp on the GSM cell.

To enable this, the device, when operating with the UMTS network, imports system information from the GSM network to the UMTS network to determine whether cell reselection from the GSM network to the UMTS network would occur. In one embodiment, the device imports from the GSM network System Information as set out in 3GPP Technical Specification 45.008 v. 5.22.0, herein incorporated by reference in its entirety. In particular, the device imports System Information from the SI2-Quarter fields (FDD_Qoffset, FDD_Qmin, FDD_Qmin_Offset, FDD_Rscp_min, Boolean_FDD_Rscp_min stating whether FDD_Rscp_min has been transmitted in SI2-Quarter). These values are used by the device to determine GSM to UMTS reselection according to the following algorithm.

According to 3GPP Technical Specification 45.008 v 5.22.0 section 6.6.5, the algorithm for cell reselection from GSM to UMTS is as follows:

> If the 3G Cell Reselection list includes UTRAN frequencies, the MS shall, at least every 5 s update the value RLA_C for the serving cell and each of the at least 6 strongest non serving GSM cells.
>
> The MS shall then reselect a suitable (see TS 25.304) UTRAN cell if:
>
> for a TDD cell the measured RSCP value exceeds the value of RLA_C for the serving cell and all of the suitable (see 3GPP TS 43.022) non-serving GSM cells by the value XXX_Qoffset for a period of 5 s and
>
> for an FDD cell the following criteria are all met for a period of 5 s:
> 1. its measured RSCP value exceeds the value of RLA_C for the serving cell and all of the suitable (see 3GPP TS 43.022) non-serving GSM cells by the value XXX_Qoffset,
> 2. its measured Ec/No value is equal or greater than the value FDD_Qmin, and
> 3. its measured RSCP value is equal to or greater than FDD_RSCP_threshold, if supported by the MS.

The above shows the specific algorithm set out in TS 45.008 for cell reselection from GSM to UMTS. This algorithm is applied at step 208 to the current measurements of the GSM network. The Boolean_FDD_Rscp_min field allows the use of the current serving cell "Qrxlevmin+Pcompensation+10 dB" for determining GSM reselection. If, for the GSM cell, reselection from GSM to UMTS is identified to be required, then reselection to that GSM cell is suppressed, and the cell may be considered to be lower ranked than the current serving cell, assuming the current serving cell is a suitable cell.

Furthermore, an offset may be applied to one or more of the current measurements before the algorithm is applied. With this implementation, the device is less likely to reselect the cell of the GSM network if the current measurements in the GSM network are borderline. For example, an offset (for instance an offset of 2 dB) may be applied to one or more of the values of RLA_C, Ec/No and RSCP.

When the device, operating with the UMTS network, determines that the algorithm for cell reselection from the GSM network to the UMTS network would not result in reselection to the UMTS network (210 answered in the negative), the device may continue with cell reselection to the GSM cell (212) according to known procedures which will not be considered further in this document. It will be appreciated by the skilled reader that other steps for cell reselection are undertaken (212). If successful cell reselection to the GSM cell under consideration is not achieved (214) then the next cell in the neighbouring cell will be considered (203). If successful cell reselection to the GSM cell under consideration is achieved (214) then the cell reselection process ends (216).

When the wireless telecommunications device, operating with the UMTS network, determines that the algorithm for cell reselection from the GSM network to the UMTS network would result in reselection to the UMTS network (210 answered in the affirmative), the GSM cell under consideration is not selected (218) and the device then considers the next highest cell in the neighbouring cell list (203). The likelihood of the wireless telecommunications device ping-ponging between the UMTS network and the GSM network should therefore be reduced.

The example is similar for a wireless telecommunications device camped on a GSM cell when considering a UMTS cell. The device applies to current measurements of the UMTS network an algorithm for cell reselection from UMTS to the GSM (208). That is, action 208 comprises applying to the current measurements of the UMTS network the algorithm for cell reselection that would be applied in the UMTS network to determine whether the algorithm when applied would result in reselection to GSM. From this algorithm, the device then determines (210) whether cell reselection from the UMTS to GSM would be required if the device were to camp on the UMTS cell.

To enable this, the device, when operating with the GSM network, imports system information from the UMTS network to determine whether cell reselection from the UMTS network to the GSM network would occur. In one embodiment, the device imports from the UMTS network System Information from at least one of System Information Block SIB3, SIB4, SIBI11 and SIB12 as set out in 3GPP Technical specification 25.304 v 5.9.0, herein incorporated by reference in its entirety. Sections 5.2.6 and 5.4.3 are the most relevant to cell reselection.

This UMTS system information is used by the device to determine UMTS to GSM reselection for the UMTS cell under consideration. The device applies this system information to an algorithm for determining whether cell reselection from UMTS to GSM would be required by the UMTS cell under consideration. The algorithm for determining whether cell reselection from UMTS to GSM would be required by the UMTS cell under consideration is set out at various points in the UMTS standards, for instance, in section 5.2.6.1.4 of TS 25.304.

The above refers to a specific algorithm set out in TS 25.304 for cell reselection from UMTS to GSM. This algorithm (and any other applicable algorithms for determining cell reselection from UMTS to GSM) is applied at step 208 to the current measurements of the UMTS network. If, for the UMTS cell under consideration, reselection from UMTS to GSM is identified to be required, then reselection to that UMTS cell is suppressed, and the cell may be considered to be lower ranked than the current serving cell, assuming the current serving cell is a suitable cell.

Furthermore, an offset may be applied to one or more of the current measurements before the algorithm is applied. With this implementation, the device is less likely to reselect the cell of the UMTS network if the current measurements in the UMTS network are borderline. For example, an offset (for instance an offset of 2 dB) may be applied to one or more of the values imported.

When the wireless telecommunications device, operating with the GSM network, determines that the algorithm for cell reselection from the UMTS network to the GSM network would not result in reselection to the GSM network (210 answered in the negative), the device may continue with cell reselection to the UMTS cell (212) according to known procedures which will not be considered further in this document. It will be appreciated by the skilled reader that other steps for cell reselection are undertaken (212). If successful cell reselection to the UMTS cell under consideration is not achieved (214) then the next cell in the neighbouring cell will be considered (203). If successful cell reselection to the UMTS cell under consideration is achieved (214) then the cell reselection process ends (216).

When the device, operating with the GSM network, determines that the algorithm for cell reselection from the UMTS network to the GSM network would result in reselection to the GSM network (210 answered in the affirmative), the UMTS cell under consideration is not selected (218) and the device then considers the next highest cell in the neighbouring cell list (203). The likelihood of the device ping-ponging between the UMTS network and the GSM network should therefore be reduced.

Embodiments of the method have been described with reference to a multi-mode device operable with GSM and UMTS. It will be apparent to a skilled reader that the method is applicable to other multi-mode devices (i.e. a device operable with a plurality of radio access networks), for instance a device operable with GSM, WiFi and UMTS for example. Furthermore, whilst the methods have been described with reference to GSM and UMTS, it will be apparent to a skilled reader that the method is applicable to many other radio access networks, including future developments of the radio access networks discussed herein as well as other radio access network that have not been described in relation to the examples given e.g. cdma200, EDGE, and others.

The strategies for cell reselection in a wireless telecommunications device operative with a plurality of radio access networks as discussed above with reference to the drawings may be implemented by the radio resource block of a protocol stack. A mobile communication device includes a protocol stack for each radio access network with which the mobile communication device is operable.

Figure 4:
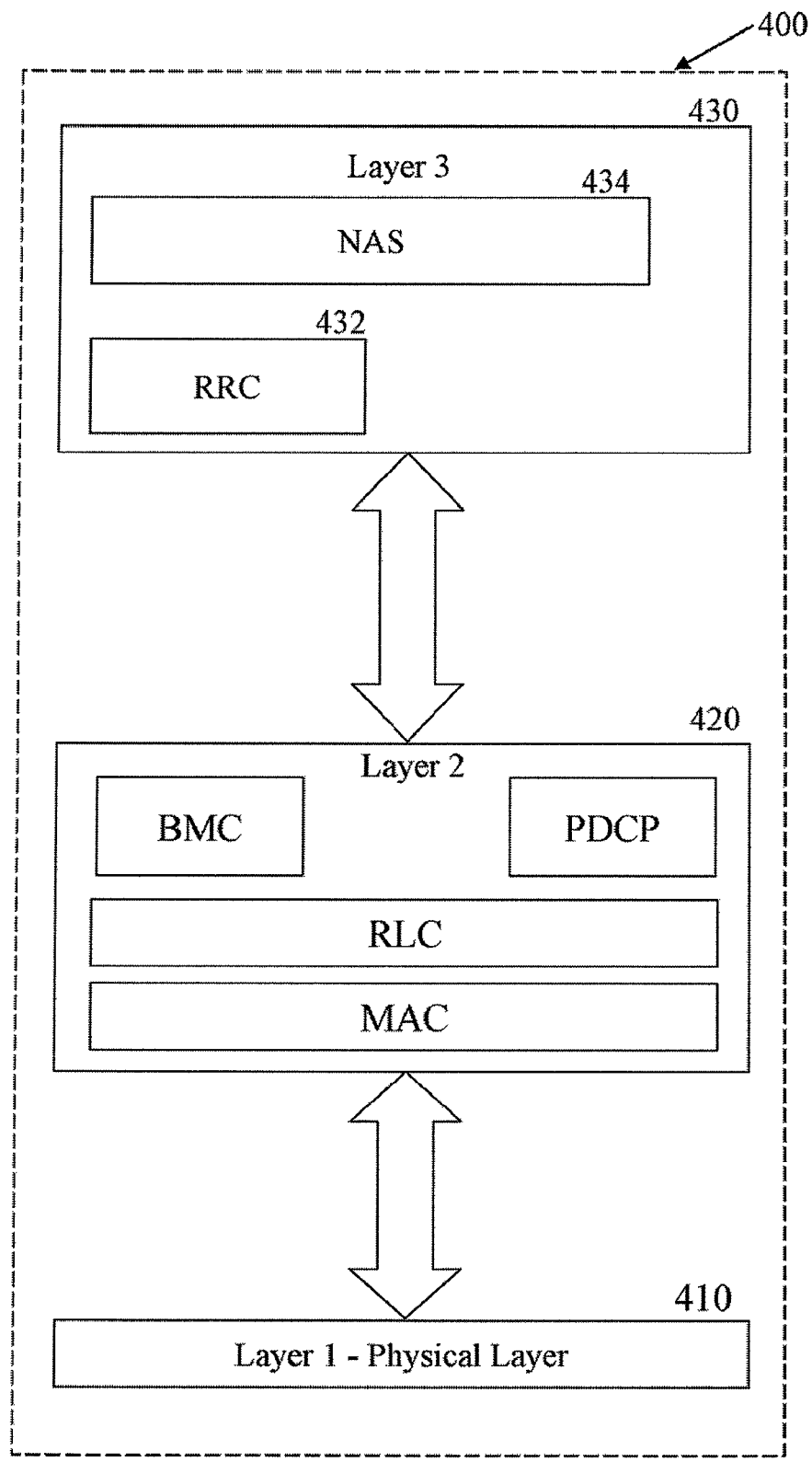
FIG. 4 is a block diagram illustrating an embodiment of a UMTS protocol stack apparatus provided with a RRC block, in accordance with the present application.

FIG. 4 is a block diagram illustrating an embodiment of a UMTS protocol stack provided in a UE. A Radio Resource Controller (RRC) block 432 is a sub layer of Layer 3 430 of a UMTS protocol stack 400. The RRC 432 exists in the control plane only and provides an information transfer service to the non-access stratum NAS 434. The RRC 432 is responsible for controlling the configuration of radio interface Layer 1 410 and Layer 2 420. When the UTRAN wishes to change the UE configuration it will issue a message to the UE containing a command to invoke a specific RRC procedure. The RRC layer 432 of the UE decodes this message and initiates the appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply.

The strategies for cell reselection in a wireless telecommunications device operative with a plurality of radio access networks as discussed above with reference to the drawings may be implemented by the RRC block 432 of the UMTS protocol stack and similar blocks of the protocol stacks of the mobile communication device for the other radio access networks e.g, in GSM, the RR block.

Figure 5:
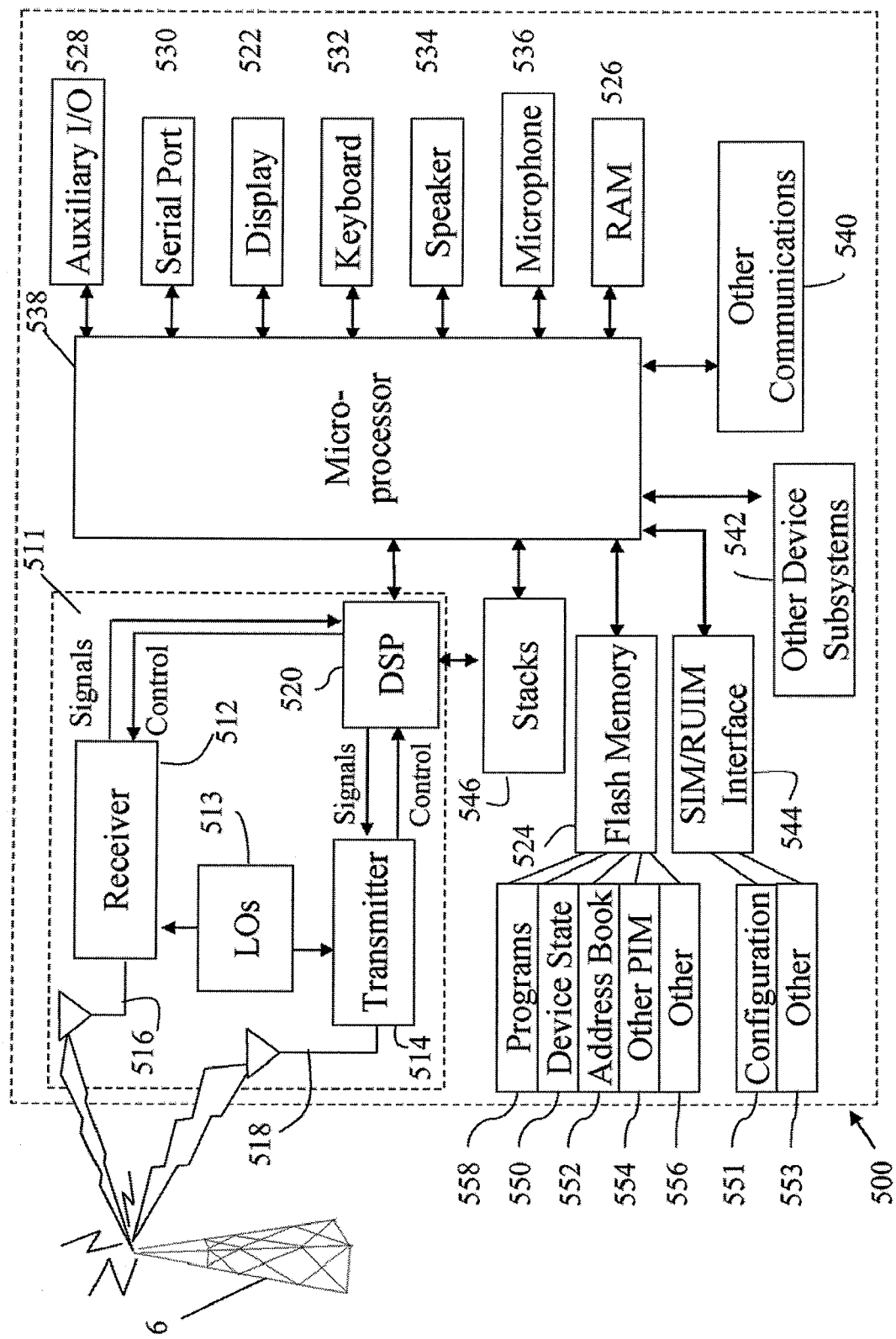
FIG. 5 is a block diagram illustrating a mobile device, which can act as a UE and co-operate with the apparatus and methods of FIGS. 1 to 4.

Turning now to FIG. 5, FIG. 5 is a block diagram illustrating a mobile wireless telecommunications device, which can act as a UE and co-operate with the apparatus and methods of FIGS. 1 to 4, and which is an exemplary wireless communication device. Mobile station 500 is preferably a two-way wireless communication device having at least voice and data communication capabilities. Mobile station 500 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 500 is enabled for two-way communication, it will incorporate a communication subsystem 511, including both a receiver 512 and a transmitter 514, as well as associated components such as one or more, preferably embedded or internal, antenna elements 516 and 518, local oscillators (LOs) 513, and a processing module such as a digital signal processor (DSP) 520. As will be apparent to those skilled in the field of communications, the particular design of the communication subsystem 511 will be dependent upon the communication network in which the device is intended to operate. For example, mobile station 500 may include a communication subsystem 511 designed to operate within the Mobitex™ mobile communication system, the DataTAC™ mobile communication system, GPRS network, UMTS network, or EDGE network.

Network access requirements will also vary depending upon the type of network 502. For example, in the Mobitex and DataTAC networks, mobile station 500 is registered on the network using a unique identification number associated with each mobile station. In UMTS and GPRS networks, however, network access is associated with a subscriber or user of mobile station 500. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 500 will be unable to carry out any other functions involving communications over the network 502. The SIM interface 544 is normally similar to a card-slot into which a SIM card can be inserted and ejected like a diskette or PCMCIA card. The SIM card can have approximately 64K of memory and hold many key configuration 551, and other information 553 such as identification, and subscriber related information.

When required network registration or activation procedures have been completed, mobile station 500 may send and receive communication signals over the network 502. Signals received by antenna 516 through communication network 502 are input to receiver 512, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 520. In a similar manner, signals to be transmitted are processed, including modulation and encoding for example, by DSP 520 and input to transmitter 514 for digital to analog conversion, frequency up conversion, filtering, amplification and transmission over the communication network 502 via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Mobile station 500 preferably includes a microprocessor 538 which controls the overall operation of the device. Communication functions, including at least data and voice communications, are performed through communication subsystem 511. Microprocessor 538 also interacts with further device subsystems such as the display 522, flash memory 524, random access memory (RAM) 526, auxiliary input/output (I/O) subsystems 528, serial port 530, keyboard 532, speaker 534, microphone 536, a short-range communications subsystem 540 and any other device subsystems generally designated as 542.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list.

Operating system software used by the microprocessor 538 is preferably stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526.

As shown, flash memory 524 can be segregated into different areas for both computer programs 558 and program data storage 550, 552, 554 and 556. These different storage types indicate that each program can allocate a portion of flash memory 524 for their own data storage requirements. Microprocessor 538, in addition to its operating system functions, preferably enables execution of software applications on the mobile station. A predetermined set of applications that control basic operations, including at least data and voice communication applications for example, will normally be installed on mobile station 500 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 502. In a preferred embodiment, the PIM data items are seamlessly integrated, synchronized and updated, via the wireless network 502, with the mobile station user's corresponding data items stored or associated with a host computer system. Further applications may also be loaded onto the mobile station 500 through the network 502, an auxiliary I/O subsystem 528, serial port 530, short-range communications subsystem 540 or any other suitable subsystem 542, and installed by a user in the RAM 526 or preferably a non-volatile store (not shown) for execution by the microprocessor 538. Such flexibility in application installation increases the functionality of the device and may provide enhanced on-device functions, communication-related functions, or both. For example, secure communication applications may enable electronic commerce functions and other such financial transactions to be performed using the mobile station 500.

In a data communication mode, a received signal such as a text message or web page download will be processed by the communication subsystem 511 and input to the microprocessor 538, which preferably further processes the received signal for output to the display 522, or alternatively to an auxiliary I/O device 528. A user of mobile station 500 may also compose data items such as email messages for example, using the keyboard 532, which is preferably a complete alphanumeric keyboard or telephone-type keypad, in conjunction with the display 522 and possibly an auxiliary I/O device 528. Such composed items may then be transmitted over a communication network through the communication subsystem 511.

For voice communications, overall operation of mobile station 500 is similar, except that received signals would preferably be output to a speaker 534 and signals for transmission would be generated by a microphone 536. Alternative voice or audio I/O subsystems, such as a voice message recording subsystem, may also be implemented on mobile station 500. Although voice or audio signal output is preferably accomplished primarily through the speaker 534, display 522 may also be used to provide an indication of the identity of a calling party, the duration of a voice call, or other voice call related information for example.

Serial port 530 in FIG. 5, would normally be implemented in a personal digital assistant (PDA)-type mobile station for which synchronization with a user's desktop computer (not shown) may be desirable, but is an optional device component. Such a port 530 would enable a user to set preferences through an external device or software application and would extend the capabilities of mobile station 500 by providing for information or software downloads to mobile station 500 other than through a wireless communication network. The alternate download path may for example be used to load an encryption key onto the device through a direct and thus reliable and trusted connection to thereby enable secure device communication.

Other communications subsystems 540, such as a short-range communications subsystem, is a further optional component which may provide for communication between mobile station 500 and different systems or devices, which need not necessarily be similar devices. For example, the subsystem 540 may include an infrared device and associated circuits and components or a Bluetooth™ communication module to provide for communication with similarly enabled systems and devices.

When mobile device 500 is used as a UE, protocol stacks 546 include apparatus and a method of cell reselection in a wireless telecommunications device operative with a plurality of radio access networks.

Extensions and Alternatives

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a wireless telecommunications device or UTRAN or other user equipment or access network components, a combination of multiple such components for example in communication with one another or a sub-network or full network of such components.

Embodiments have been described herein in relation to 3GPP specifications. However the method and apparatus described are not intended to be limited to the specifications or the versions thereof referred to herein but may be applicable to future versions or other specifications.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

The invention claimed is:

1. A method of cell reselection in a wireless telecommunications device operative with a plurality of radio access networks, the method comprising:
when the device is camped on a first radio access network, ranking cells in a neighbouring list according to cell reselection criteria;

considering for cell reselection a cell in the neighbouring list;

when the cell in the list is a cell of a second radio access network different from the first radio access network, applying an algorithm for cell reselection from the second radio access network to the first radio access network; and when the algorithm as applied would result in reselection to the first radio access network, considering for cell reselection another cell in the list when present.

2. A method according to claim 1 wherein, when no suitable cell is identified other than a cell of a second radio access network which, when the algorithm as applied, would result in reselection to the first radio access network, further comprising proceeding with the cell reselection process with the cell of the second radio access network.

3. A method according to claim 1 wherein an offset is applied to at least one measurement of at least one of the first radio access network and the second radio access network prior to applying the algorithm.

4. A method according to claim 1 wherein the first radio access network is a UMTS network and the second radio access network is a GSM network and the algorithm for cell reselection from GSM to UMTS is applied.

5. A method according to claim 1 wherein the first radio access network is a UMTS network and the second radio access network is a GSM network and further comprising importing GSM System Information from at least one of the SI2-Quarter fields (FDD_Qoffset, FDD_Qmin, FDD_Qmin_Offset, FDD_Rscp_min, Boolean_FDD_Rscp_min stating whether FDD_Rscp_min has been transmitted in SI2-Quarter) and the algorithm is based on the algorithm in 3GPP Technical Specification 45.008 v 5.22.0 section 6.6.5.

6. A method according to claim 1 wherein the first radio access network is a GSM network and the second radio access network is a UMTS network and the algorithm for cell reselection from UMTS to GSM is applied.

7. A method according to claim 1 wherein the first radio access network is a GSM network and the second radio access network is a UMTS network and further comprising importing at least one UMTS system information and the algorithm is based on the algorithm in 3GPP Technical Specification 25.304 v 5.9.0 section 5.2.6.

8. A method according to claim 1 wherein the plurality of radio access networks include at least two of a second generation mobile telecommunications network, a third generation mobile telecommunications network and a fourth generation mobile telecommunications network.

9. A method according to claim 1 wherein the first network is a wideband code division multiple access network and the second radio access network is a time division multiple access network.

10. A method according to claim 1 further comprising importing system information of the second radio access network into the device for use in the algorithm for cell reselection from the second radio access network to the first radio access network.

11. A wireless telecommunications device operative with a plurality of radio access networks, the wireless telecommunications device being arranged, in use, to:

when the device is camped on a first radio access network, rank cells in a neighbouring list according to cell reselection criteria;

consider for cell reselection a cell in the neighbouring list;

when the cell in the list is a cell of a second radio access network different from the first radio access network, apply an algorithm for cell reselection from the second radio access network to the first radio access network; and when the algorithm as applied would result in reselection to the first radio access network, consider for cell reselection another cell in the list when present.

12. A wireless telecommunications device according to claim 11 wherein, when no suitable cell is identified other than a cell of a second radio access network which, when the algorithm as applied, would result in reselection to the first radio access network, the device is arranged to proceed with the cell reselection process with the cell of the second radio access network.

13. A wireless telecommunications device according to claim 11 wherein the device is arranged to apply an offset to at least one measurement of at least one of the first radio access network and the second radio access network prior to applying the algorithm.

14. A wireless telecommunications device according to claim 11 wherein the first radio access network is a UMTS network and the second radio access network is a GSM network and the algorithm for cell reselection from GSM to UMTS is applied.

15. A wireless telecommunications device according to claim 11 wherein the first radio access network is a UMTS network and the second radio access network is a GSM network and the device is arranged to import GSM System Information from at least one of the SI2-Quarter fields (FDD_Qoffset, FDD_Qmin, FDD_Qmin_Offset, FDD_Rscp_min, Boolean_FDD_Rscp_min stating whether FDD_Rscp_min has been transmitted in SI2-Quarter) and the algorithm is based on the algorithm in 3GPP Technical Specification 45.008 v 5.22.0 section 6.6.5.

16. A wireless telecommunications device according to claim 11 wherein the first radio access network is a GSM network and the second radio access network is a UMTS network and the algorithm for cell reselection from UMTS to GSM is applied.

17. A wireless telecommunications device according to claim 11 wherein the first radio access network is a GSM network and the second radio access network is a UMTS network and the device is arranged to import UMTS system information and the algorithm is based on the algorithm in 3GPP Technical Specification 25.304 v 5.9.0 section 5.2.6.

18. A wireless telecommunications device according to claim 11 wherein the plurality of radio access networks include at least two of a second generation mobile telecommunications network, a third generation mobile telecommunications network and a fourth generation mobile telecommunications network.

19. A wireless telecommunications device according to claim 11 wherein the first network is a wideband code division multiple access network and the second radio access network is a time division multiple access network.

20. A wireless telecommunications device according to claim 11 wherein the device is arranged to import system information of the second radio access network into the device for use in the algorithm for cell reselection from the second radio access network to the first radio access network.

21. A non-transitory computer-readable medium configured to carry out the actions of claim 1.

22. A non-transitory computer-readable storage medium having stored thereon instructions which can be executed by a device to carry out the actions of claim 1.

* * * * *